United States Patent [19]

Sawada et al.

[11] Patent Number: 4,759,212

[45] Date of Patent: Jul. 26, 1988

[54] ABNORMALITY DETERMINATION DEVICE FOR A VEHICLE SPEED SENSOR

[75] Inventors: Kazuhisa Sawada, Owariasahi; Tatsuo Teratani, Aichi, both of Japan

[73] Assignee: Toyota Jidosha Kabushiki Kaisha, Toyota, Japan

[21] Appl. No.: 936,313

[22] Filed: Dec. 1, 1986

[30] Foreign Application Priority Data

Dec. 11, 1985 [JP] Japan .................................. 60-278549

[51] Int. Cl.[4] .......................................... G01M 13/02
[52] U.S. Cl. .................................................. 73/118.1
[58] Field of Search .................... 73/118.1, 2, 117.3; 74/859, 872; 340/62; 364/551

[56] References Cited

U.S. PATENT DOCUMENTS 4,233,599 11/1980 Brearley .......................... 340/62 X
4,564,916 1/1986 Hori et al. ....................... 340/62 X

FOREIGN PATENT DOCUMENTS 59-145945 8/1984 Japan .

Primary Examiner—Jerry W. Myracle
Attorney, Agent, or Firm—Oblon, Fisher, Spivak, McClelland & Maier

[57] ABSTRACT

Provided is an abnormality determination device for a vehicle speed sensor which can prevent a memory unit from storing the erroneous result of abnormality determination of a vehicle speed sensor due to the engine racing when the vehicle is stationary. The device of the invention includes a revolution speed sensor for detecting a revolution speed of an output shaft of an automatic transmission and generating a speed signal, abnormality determination elements for inputting the speed signal of the revolution speed sensor and for determining if the revolution speed sensor is abnormal and for generating an abnormality signal in response to the determined result, a memory for storing the abnormality signal, and halt elements for preventing the memory from storing the abnormality signal when the automatic transmission is set at a neutral position or at a parking position.

11 Claims, 7 Drawing Sheets

ABNORMALITY DETERMINATION DEVICE FOR A VEHICLE SPEED SENSOR

FIELD OF THE INVENTION

This invention relates to an abnormality determination device for determining the abnormality of a vehicle speed sensor provided to an output shaft of an automatic transmission of a vehicle.

BACKGROUND OF THE INVENTION

As for an electronically controlled automatic transmission of a vehicle, the selection of a plurality of gear position is operated by selectively actuating solenoids in response to the vehicle speed and the throttle opening. Such an electrically controlled automatic transmission is, however, impractical unless the vehicle speed and the throttle opening are accurately detected. For accurate detection of the vehicle speed, various types of abnormality determination devices for a vehicle speed sensor have been developed so far. For example, a diagnosis device for an electrically controlled transmission of a vehicle was proposed in Japan Published Unexamined Patent Application No. Sho 59-145945. In this device, two vehicle speed sensors are employed, and the vehicle speeds detected by these sensors are compared with each other. If the rate of the vehicle speeds of one sensor to the other is greater or less than a predetermined range, the device determines that at least one of the sensors has gone wrong or is working abnormally. This condition is stored in the form of a certain digital code, and then outputted to execute the self diagnosis.

Figure 7:
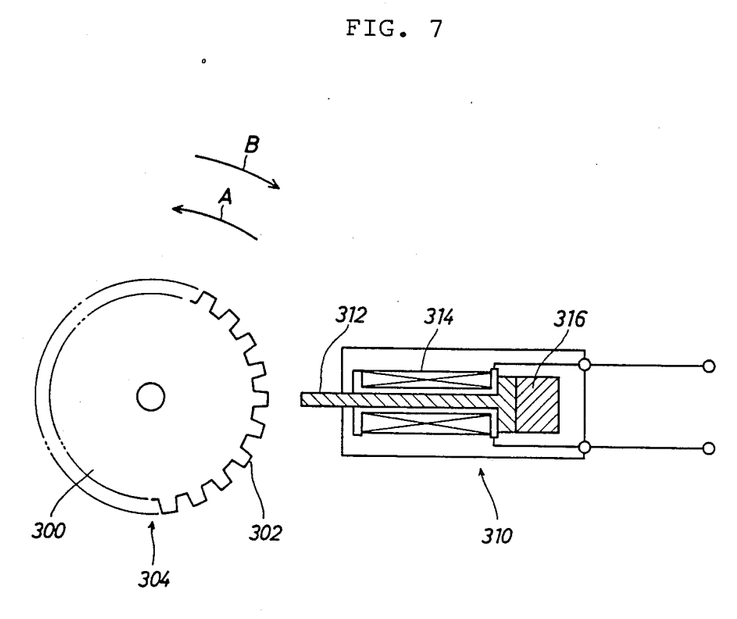
FIG. 7 is a diagram showing the structure of the revolution speed sensor of the embodiment.

One of the above-mentioned vehicle speed sensors is provided to an output shaft of an automatic transmission, and the other is installed in a speedometer unit. The latter one essentially consists of a magnet which is mechanically connected to the output shaft to be rotated together, and a reed switch for detecting the magnet. On the other hand, as shown in FIG. 7, the vehicle speed sensor provided to the output shaft is mainly made up of a rotor 304 including a gear 302 formed at the output shaft 300 and a pickup unit 310 which is mounted in proximity and opposite to the rotor 304 and includes a core 312, coils 314 and a magnet 316.

Both of the above-mentioned sensors detect the revolution speed of the output shaft. However, if racing (i.e., boosting up of the engine revolution without load is carried out when the shift position of the automatic transmission gear is set in the neutral position (N position) or the parking position (P position) and the vehicle is stationary, a slight vibration in the directio of arrows A and B shown in FIG. 7 due to the engine racing occurs to the rotor 304. The pickup unit 310 detects this vibration and generates a speed signal. On the other hand, the vehicle speed sensor installed in the speedometer does not generate a speed signal because the output shaft 300 is not actually rotating. Such an inconsistency sometimes brings about a problem that at least one of the sensors is determined to be abnormal by mistake due to the difference of the output signal, and the result of this determination is stored in a memory. Because of this, the wrong information is given when the self diagnosis is performed for the maintenance of the vehicle.

OBJECT OF THE INVENTION

The object of this invention is to provide an abnormality determination device for a vehicle speed sensor which can prevent a memory unit from storing the erroneous result of abnormality determination of a vehicle speed sensor due to the engine racing when the vehicle is stationary.

SUMMARY OF THE INVENTION

Figure 1:
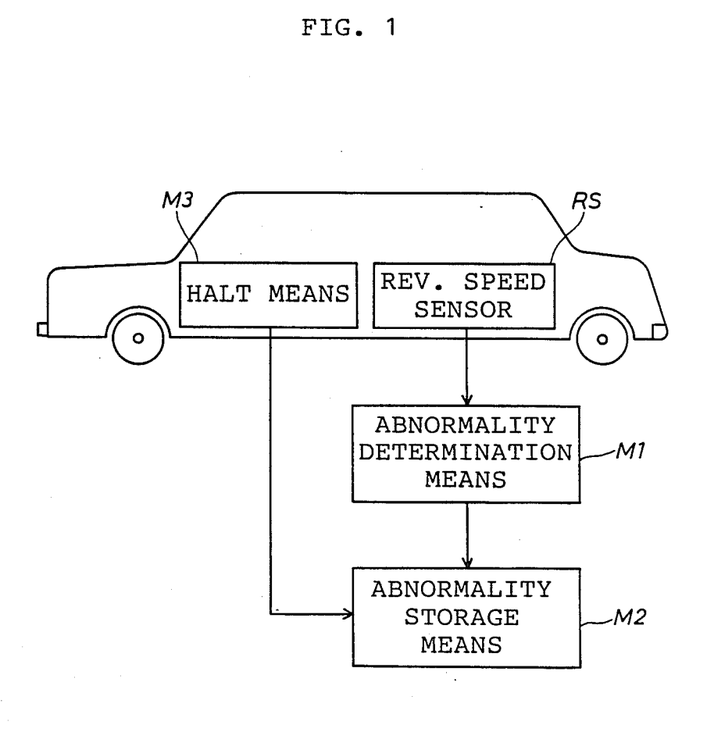
FIG. 1 shows a basic structure embodying the present invention.

In order to solve the above-mentioned problem and others, the abnormality determination device of the present invention includes, as shown in FIG. 1, a revolution speed sensor RS for detecting a revolution speed of an output shaft of an automatic transmission and for generating a speed signal, abnormality determination means M1 for determining if the revolution speed sensor RS is abnormal and for generating an abnormality signal in response to the determined result, storage means M2 for storing the abnormality signal, and halt means M3 for preventing the storage means M2 from storing the abnormality signal when the shift position of the automatic transmission is set in a neutral position or in a parking position.

The above-mentioned revolution speed sensor RS may employ a magnet and a reed switch for detecting the revolution speed of the output shaft of the automatic transmission, or it may employ a pickup unit which is provided in proximity and opposite a pulse gear formed at the output shaft of the transmission. According to the revolution speed, the sensor RS outputs a revolution speed signal.

The abnormality determination means M1 determines the revolution speed sensor RS to be abnormal if the output signal from the revolution speed sensor RS indicates that the vehicle is moving, while, in effect, the vehicle is stationary as detected by a speedometer. For another way of determination, a plurality of revolution speed sensors RS are provided, and the determination means M1 determines the sensor RS is abnormal when the speed signals outputted from plural sensors RS differ from one another and the difference exceeds a predetermined value.

The abnormality storage means M2 is, for example, a nonvolatile memory which stores abnormality of the sensor RS and outputs or indicates the stored information according to a command.

The halt means M3 functions to interrupt the abnormality storage means M2 to store the determination result of the abnormality determination means M1 when the shift position of the automatic transmission is set in the neutral position or the parking position. Therefore, if the abnormality of the revolution speed sensor RS due to the engine racing is detected when the shift position is set in the neutral position or the parking position, the abnormality is not stored by the abnormality storage means C.

BRIEF DESCRIPTION OF DRAWINGS

The invention may be best understood by reference to the following description of a preferred embodiment and the drawings in which.

DETAILED DESCRIPTION OF PREFERRED EMBODIMENT

Figure 2:
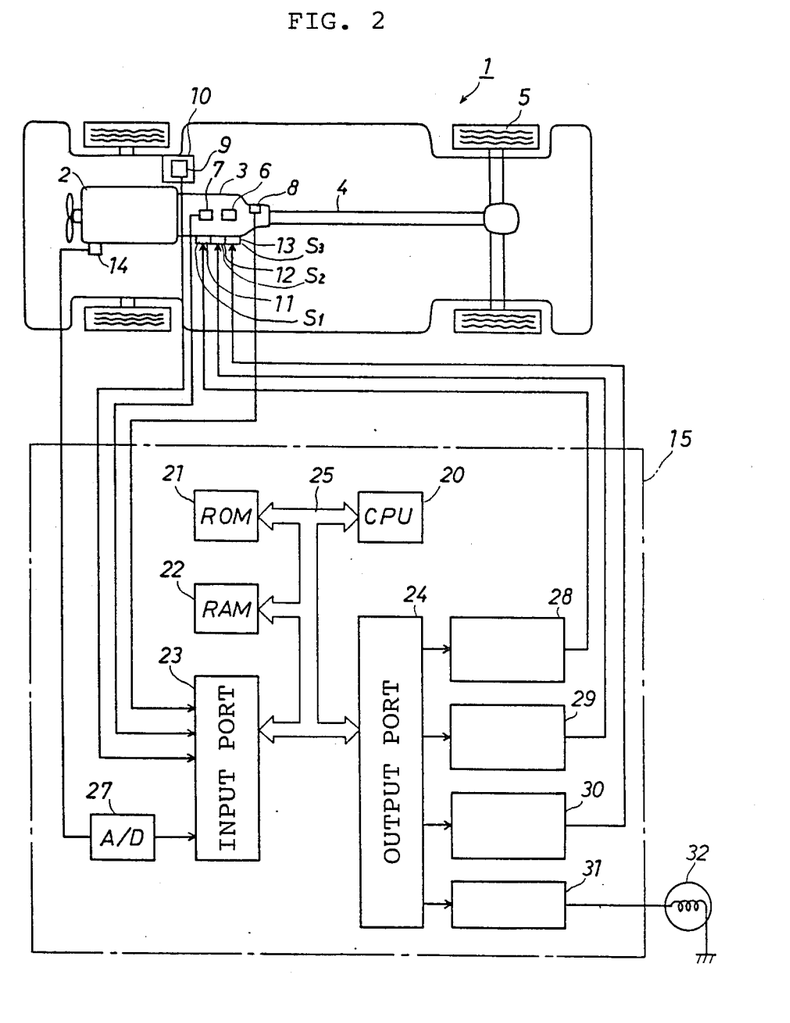
FIG. 2 is a systematic diagram of an embodiment of the present invention.

FIG. 2 shows a structure of an embodiment of this invention. Numeral 1 shows a vehicle body, numeral 2 indicates an engine thereof, numeral 3 shows an automatic transmission for changing the output power of the engine 2, numeral 4 is a propeller shaft for transmitting the output power of the automatic transmission 3 to rear wheels 5, numeral 6 denotes a shift lever of the automatic transmission 3, numeral 7 is a shift position sensor, numeral 8 shows a pickup-type first revolution speed sensor (SP1) for detecting the revolution speed of the output shaft of the transmission 3, numeral 9 indicates a reed switch-type second revolution speed sensor (SP2) installed in a speedometer 10, numerals 11 to 13 respectively show solenoid valves S1, S2 and S3 for hydraulically controlling the automatic transmission 3, numeral 14 is a throttle sensor for detecting the throttle opening of the engine 2, and numeral 15 shows an electronic control unit (ECU) for controlling the automatic transmission 3. The ECU 15 is equipped with a CPU 20, a ROM 21, a RAM 22, an input port 23, an output port 24 and a common bus 25. A signal generated by the throttle sensor 14 is inputted into the input port 23 via an A/D converter 27. Signals from the shift position switch 7, the first and the second revolution speed sensors 8 and 9 (SP1, SP2) are also inputted into the input port 23. From the output port 24, the speed change signal is outputted to the solenoids S1, S2 and S3 via solenoid actuators 28, 29 and 30, and an indication signal is outputted to an abnormality indication lamp 32 via a lamp actuator 31.

Figure 3:
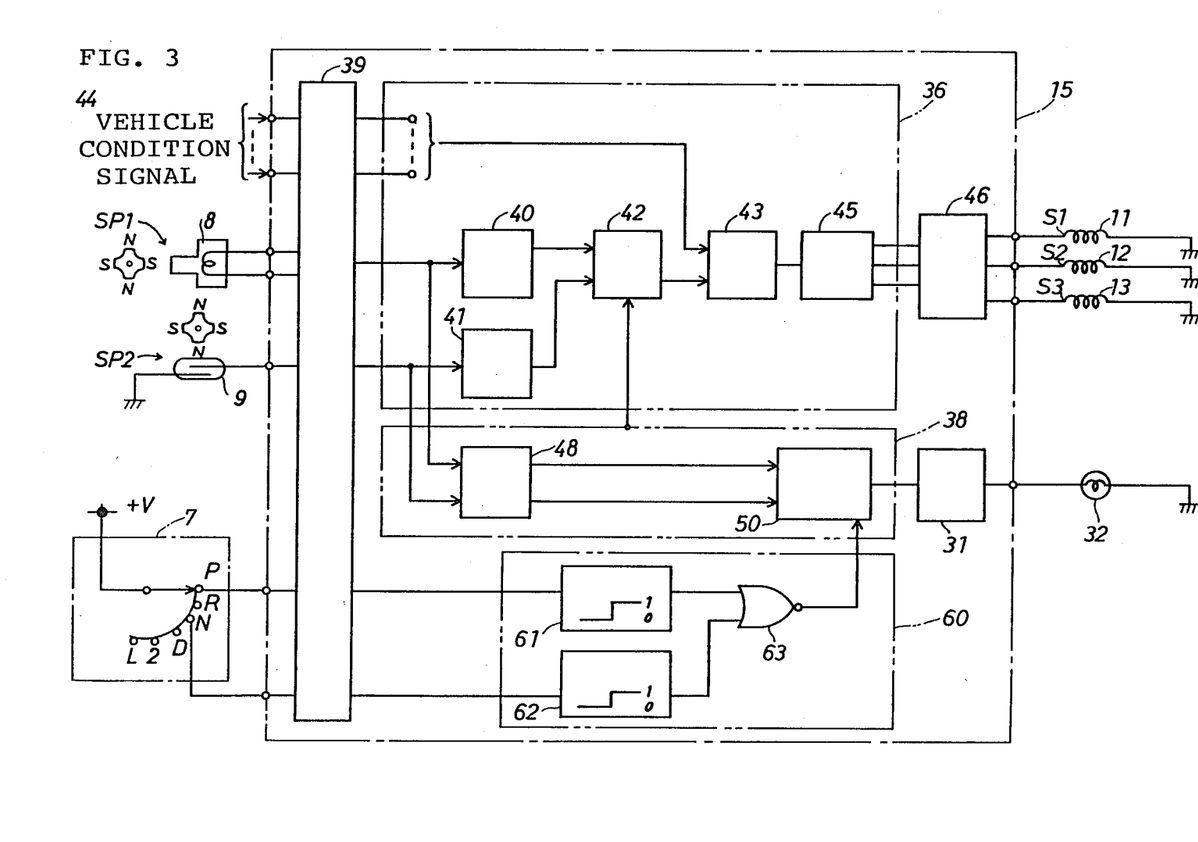
FIG. 3 is a fundamental block diagram of the embodiment.
Figure 4A:
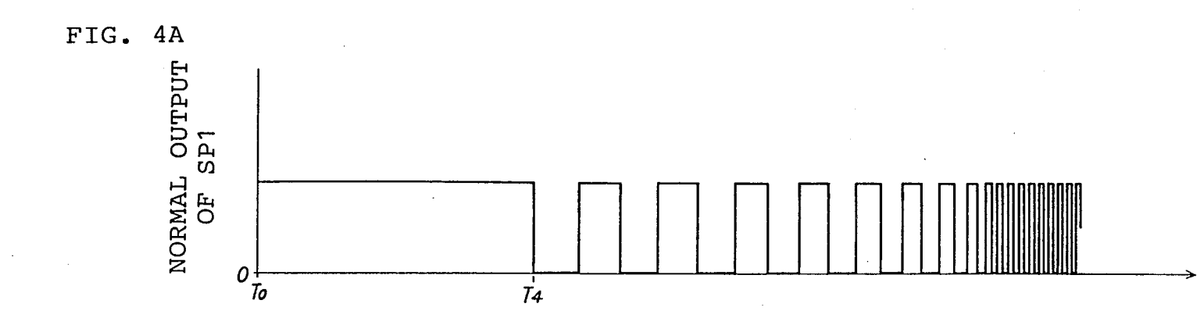
FIGS. 4A and 4B are timing charts showing the output pulses of the revolution speed sensor of the embodiment.
Figure 4B:
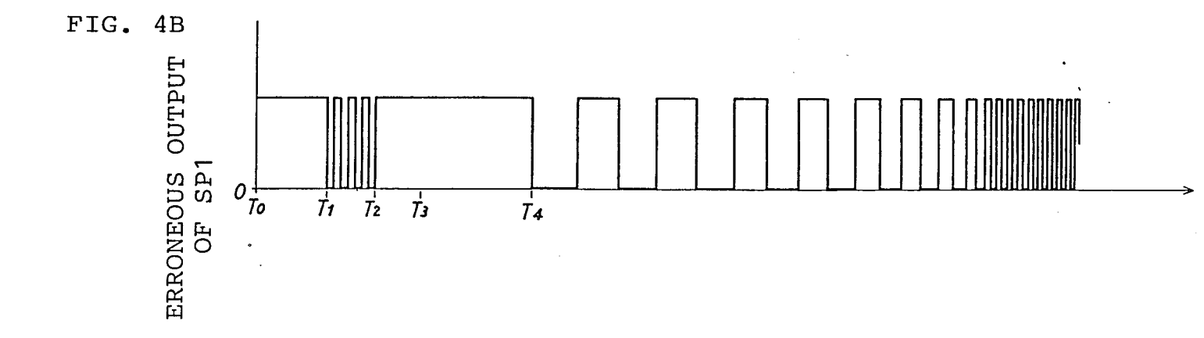

FIG. 3 is a fundamental block diagram of the present embodiment according to the above-mentioned constitution, and FIGS. 4A and 4B are timing charts thereof. More exactly, FIG. 3 is a block diagram indicating the shift process executed in accordance with speed signals from the first and the second revolution speed sensors 8 and 9 (SP1, SP2) and a vehicle condition signal such as throttle opening signal, and also indicating the process of abnormality determination of the first and the second revolution speed sensors 8 and 9. Set forth below is an explanation of a shift means 36 and a fail safe means 38 for the first and the second revolution speed sensors 8 and 9, where both means 36 and 38 are prerequisite for the application of the present embodiment. According to the shift means 36, output signals of the first and the second revolution speed sensors 8 and 9 are inputted by an input means 39, and they are converted into vehicle speed signals by vehicle speed computing means 40 and 41, and then the vehicle speed signals are inputted into a shift determination means 43 via a vehicle speed signal selection means 42. In the shift determination means 43, the selected vehicle speed signal and various vehicle condition signals 44 are inputted, and the determination of the shift process is executed based on the above-mentioned signals. The result of the shift determination means 43 is converted into driving signals of the solenoids 11, 12 and 13 (S1, S2, S3) by a shift output means 45, and the shift process of the solenoids 11, 12 and 13 are executed by a driving means 46.

A vehicle speed sensor fail count means 48 of the fail safe means 38 for the fist and the second revolution speed sensors 8 and 9 functions as follows. Namely, numbers of pulse of the outputs of both the sensors 8 and 9 are compared with each other, and if the difference is greater than a predetermined value, the smaller one is determined to be abnormal, and an abnormality signal is generated. This abnormality signal is sent to the vehicle speed signal selection means 42 for the selection of the signals of the vehicle speed computing means 40 and 41 utilized in the shift determination means 43. The result of the abnormality determination is stored in a diagnosis memory means 50. The memory of abnormality stored in the diagnosis memory means 50 is outputted to the abnormality indication lamp 32 by the lamp actuator 31.

Next, the important points of the present embodiment corresponding to each of the above-mentioned processes is explained based on FIGS. 3, 4A and 4B.

The revolution speed sensor 8 (SP1) outputs a constant signal which is shown during a time period from T0 to T4 in FIG. 4A when the vehicle is stationary, and outputs a pulse signal as shown after the time point T4 when the vehicle is started. On the other hand, when the sensor 8 (SP1) is affected by the vibration due to the engine racing while the vehicle is stationary, and a pulse signal shown during a time period from T1 to T2 of FIG. 4B is outputted, the abnormality determination results based on this pulse signal should not be stored in the diagnosis memory means 50. Therefore, during the time period from T0 to T4, i.e., while the shift position of the automatic transmission 3 is set in the parking position (P position) or the neutral position (N position), a halt means 60 for preventing the diagnosis memory means 50 from storing the abnormality determination result is actuated. The halt means 60 functions to input a signal outputted from the shift position switch 7 by the input means 39. It determines if the shift position of the automatic transmission 3 is set in the P position or in the N position by shift determination means 61 and 62. The determination results of the shift determination means 61 and 62 are stored in the diagnosis memory means 50 via a logic means (NOR circuit) 63. Namely, when the shift stage of the automatic transmission 3 is set either in the P position or in the N position, either one of the outputs of the shift determination means 61 and 62 indicates a higher level than the other one. Therefore, a low level signal is outputted to the diagnosis memory means 50 by the logic means 63. For this reason, the diagnosis memory means 50 is prohibited from storing the abnormality determination result during the time period from T0 to T4.

Figure 5:
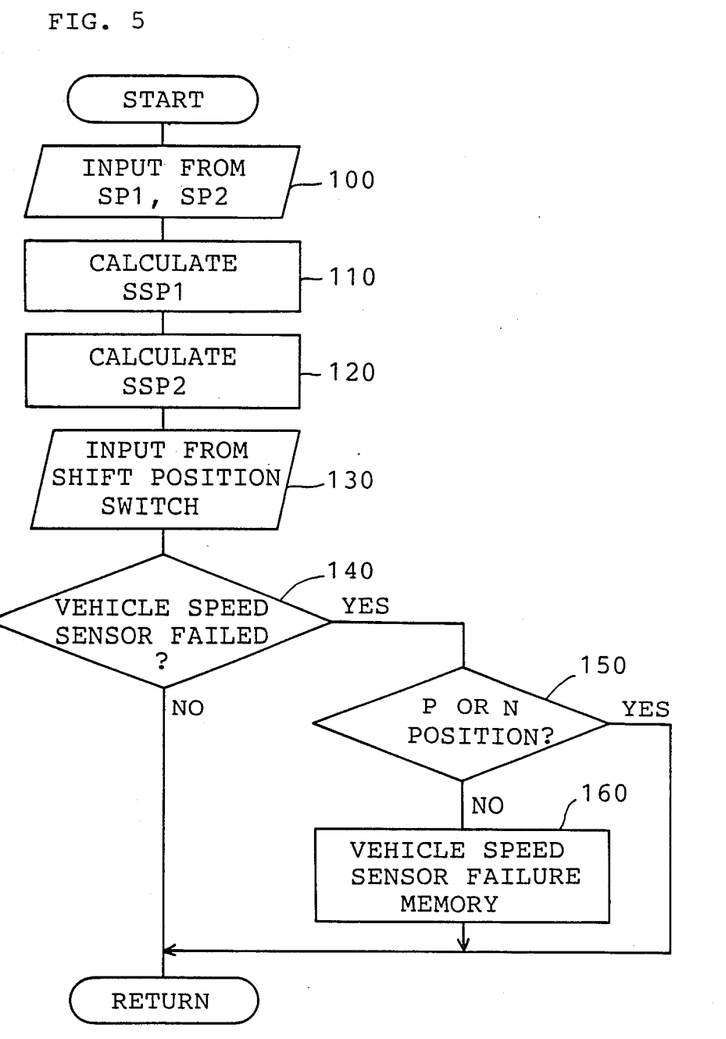
FIG. 5 is a flow chart of the control processing of the embodiment.
Figure 6:
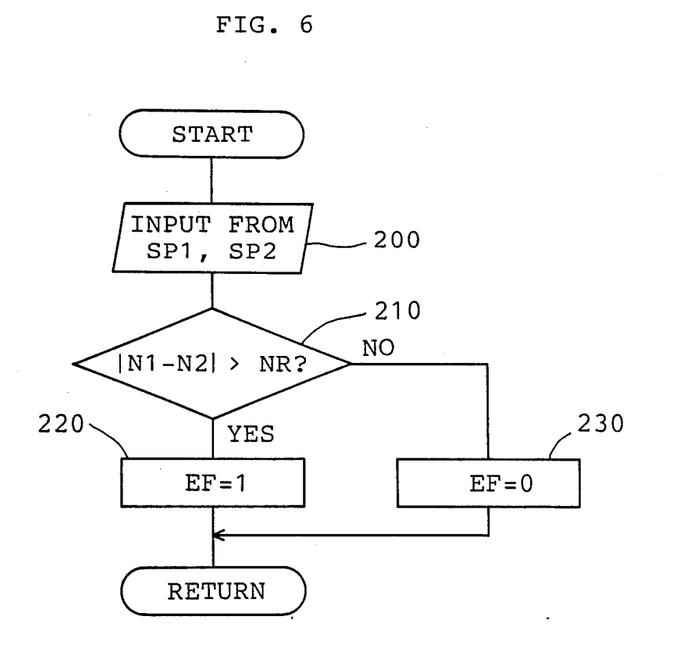
FIG. 6 is another flow chart of the control processing of the embodiment.

FIGS. 5 and 6 are flow charts indicating the control processings of the embodiment of this invention explained hereinbefore. At the beginning of the control processing, vehicle speed signals outputted from the first and the second revolution speed sensors 8 and 9 (SP1, SP2) are inputted at step 100 to calculate a vehicle speed SSP1 at step 110 by the output of the sensor 8 (SP1) and to calculate a vehicle speed SSP2 at step 120 by the output of the sensor 9 (SP2). Then, a signal generated by the shift position switch 7 is inputted at step 130.

Next, it is determined at step 140 if an abnormality of the vehicle speed sensor is detected according to the value of a failure flag EF. The processing of this abnormality determination is explained hereinunder based on FIG. 6. At step 200, the vehicle speed signals outputted from the first and the second revolution speed sensors 8 and 9 (SP1, SP2) are inputted. If the difference between the numbers of output pulses N1 and N2 of the sensors 8 and 9 is greater than a predetermined value NR (step 210), either one of the sensors is determined to be failed at step 220. Then, the failure flag EF is set to 1 and the present processing is once concluded (step 220). On the other hand, if the difference of the pulse numbers of both the sensors is not greater than the value NR, the failure flag EF is reset to 0, and this processing is once concluded (steps 210, 230). This processing is repeated every predetermined time interval.

At step 140 in FIG. 5, the abnormality determination is carried out based on the set or reset failure flag EF. When the value of the failure flag EF is 0, the present control processing is once concluded. When the value is 1, it is determined at step 150 if the shift position of the automatic transmission 3 is set in the P position or the N position based on the signal sent from the shift position switch 7. When it is determined the shift position is set in the P position or the N position, the result of the abnormality determination is not stored, and this control processing is once concluded. On the other hand, if the shift position is not set in the P position nor the N position, the result of the abnormality determination is stored in the abnormality storage memory for the vehicle speed sensor, and the present processing is once concluded (step 160). After this, the control processing is repeated every predetermined time interval.

Therefore, if the pulse signals shown in the time period from T1 to T2 in FIG. 4B are generated due to the engine racing when the vehicle is stationary, the result of the abnormality determination is not stored in the memory, provided the shift position is set in the P position or the N position. Namely, the erroneous detection of the revolution speed sensor SP1 due to the engine racing is not determined to be the failure of the vehicle speed sensor and is not stored in the memory. This results in improving the reliability of the self diagnosis data of the ECU 15 and the work efficiency of the maintenance of the vehicle.

In this embodiment, if the shift position is set in any position excepting the P position or the N position, the result of the abnormality determination is stored to correctly perform the self diagnosis.

Obviously, numerous modifications and variations of the present invention are possible in light of the above teachings. It is therefore to be understood that, within the scope of the appended claims, the invention may be practiced other than as specifically described herein. For instance, the revolution speed sensor may detect the speed from any part or member of the automatic transmission that is connected to the output shaft or that is placed at the driven side of the automatic transmission. A driven member of the fluid coupling unit or a gear in the gear unit can be provided such a revolution speed sensor.

What is claimed is:

1. An abnormality determination device for a vehicle speed sensor, said abnormality determination device comprising:
   (a) a first revolution speed sensor for detecting a revolution speed of an output shaft of an automatic transmission and for generating a speed signal;
   (b) abnormality determination means for inputting the speed signal of said first revolution speed sensor, for determining if said first revolution speed sensor is abnormal, and for generating an abnormality signal in response to the determined result;
   (c) storage means for storing the abnormality signal; and
   (d) halt means for preventing said storage means from storing the abnormality signal when the automatic transmission is set at a neutral position or at a parking position.

2. An abnormality determination device for a vehicle speed sensor as claimed in claim 1, wherein said first abnormality determination means determines the abnormality of said first revolution speed sensor when the vehicle is determined to be stationary by a vehicle speed sensor and said first revolution speed sensor generates a non-zero speed signal.

3. An abnormality determination device for a vehicle speed sensor as claimed in claim 2, wherein said first revolution speed sensor comprises a magnet attached to the output shaft of the automatic transmission and a reed switch attached on the body of the vehicle, said reed switch generating a pulse signal with access of a pole of said magnet rotated with the output shaft.

4. An abnormality determination device for a vehicle speed sensor as claimed in claim 2, wherein said first revolution speed sensor comprises a gear attached to the output shaft of the automatic transmission and an electromagnetic pickup unit attached on the body of the vehicle, said pickup unit generating a pulse signal with an access of a tooth of said gear rotated with the output shaft.

5. An abnormality determination device for a vehicle speed sensor as claimed in claim 2, wherein said storage means is an electronic memory device.

6. An abnormality determination device for a vehicle speed sensor, said abnormality determination device comprising:
   (a) a first revolution speed sensor for detecting a revolution speed of an output shaft of an automatic transmission and for generation a speed signal;
   (b) a second revolution speed sensor for generating a speed signal;
   (c) abnormality determination means for inputting the speed signals of said first and second speed sensors, for determining the abnormality of either one of said first and second revolution speed sensors when the difference of the speed signals between said two sensors is greater than a preset value, and for generating an abnormality signal in response to the determined result;
   (d) storage means for storing the abnormality signal; and
   (e) halt means for preventing said storage means from storing the abnormality signal when the automatic transmission is set at a neutral position or at a parking position.

7. An abnormality determination device for a vehicle speed sensor as claimed in claim 6, wherein said first revolution speed sensor comprises a magnet attached to the output shaft of the automatic transmission and a reed switch attached on the body of the vehicle, said reed switch generating a pulse signal with access of a pole of said magnet rotated with the output shaft.

8. An abnormality determination device for a vehicle speed sensor as claimed in claim 6, wherein said first revolution speed sensor comprises a gear attached to the output shaft of the automatic transmission and an electromagnetic pickup unit attached on the body of the vehicle, said pickup unit generating a pulse signal with an access of a tooth of said gear rotated with the output shaft.

9. An abnormality determination device for a vehicle speed sensor as claimed in claim 6, wherein said storage means is a constituent of a self diagnosis device for an electronic controlled automatic transmission.

10. An abnormality determination device for a vehicle speed sensor as claimed in claim 6, wherein said storage means is an electronic memory device.

11. An abnormality determination device for a vehicle speed sensor, said abnormality determination device comprising:
(a) a first revolution speed sensor for detecting a revolution speed of an output shaft of an automatic transmission and for generating a speed signal;
(b) abnormality determination means for inputting the speed signal of said first revolution speed sensor, for determining if said first revolution speed sensor is abnormal, and for generating an abnormality signal in response to the determined result, said abnormality determination means determining the abnormality of said first revolution speed sensor when the vehicle is determined to be stationary by a vehicle speed sensor and said first revolution speed sensor generates a non-zero speed signal;
(c) storage means for storing the abnormality signal, said storage means being a constituent of a self diagnosis device for an electronic controlled automatic transmission; and
(e) halt means for preventing said storage means from storing the abnormality signal when the automatic transmission is set at a neutral position or at a parking position.

* * * * *